United States Patent [19]

Kaiser

[11] Patent Number: 4,474,988

[45] Date of Patent: Oct. 2, 1984

[54] PROCESS FOR THE PRODUCTION OF BIS-(N,N,-DIALKYLAMINO)ALKYL ETHER

[75] Inventor: Steven W. Kaiser, South Charleston, W. Va.

[73] Assignee: Union Carbide Corporation, Danbury, Conn.

[21] Appl. No.: 453,169

[22] Filed: Dec. 27, 1982

[51] Int. Cl.$^3$ ............................................. C07C 85/24
[52] U.S. Cl. .................................................... 564/508
[58] Field of Search ....................................... 564/508

[56] References Cited

U.S. PATENT DOCUMENTS

| | | | |
|---|---|---|---|
| 2,716,134 | 8/1955 | Reynolds et al. | 260/570.5 |
| 3,330,782 | 7/1967 | Poppelsdorf | 260/2.5 |
| 3,400,157 | 9/1968 | Poppelsdorf | 260/584 |
| 3,426,072 | 2/1969 | Warner | 260/584 |
| 3,448,154 | 6/1969 | Broadhead et al. | 260/584 |
| 3,480,675 | 11/1969 | Poppelsdorf | 260/584 |
| 3,891,709 | 6/1975 | Higuchi | 564/508 X |
| 3,957,875 | 5/1976 | Ferrell et al. | 260/585 |
| 4,177,212 | 12/1979 | Poppelsdorf | 260/584 |
| 4,247,482 | 1/1981 | Poppelsdorf | 564/508 |
| 4,338,408 | 7/1982 | Zimmerman et al. | 564/508 X |
| 4,352,920 | 10/1982 | Kluger | 564/508 X |

FOREIGN PATENT DOCUMENTS 847900  3/1953  Fed. Rep. of Germany ...... 564/508

*Primary Examiner*—Paul F. Shaver
*Attorney, Agent, or Firm*—Paul W. Leuzzi, II

[57] ABSTRACT

Bis-(N,N-dialkylamino)alkyl ethers are produced by reacting a (N,N-dialkylamino) alkanol over a heterogeneous solid acid catalyst. The (N,N-dialkylamino) alkanol can optionally be accompanied by an inert carrier. The resulting bis-ethers are useful as catalysts in the production of polyurethanes, especially cellular polyurethanes.

15 Claims, No Drawings

PROCESS FOR THE PRODUCTION OF BIS-(N,N,-DIALKYLAMINO)ALKYL ETHER

BACKGROUND OF THE INVENTION

The instant invention provides a novel route for producing bis-(N,N-dialkylamino)alkyl ethers. More particularly, the present invention provides a process for producing bis-(N,N-dialkylamino)alkyl ethers by the direct catalytic reaction of (N,N-dialkylamino)alkanol.

Bis[beta(N,N-dimethylamino)alkyl]ethers, including the commercially important bis[2-(N,N-dimethylamino)ethyl]ether ("BDMEE"), are known to be valuable polyurethane catalysts, particularly in the production of flexible polyurethane foam. By way of illustration, the production of polyurethane foam by reacting an organic isocyanate with an active hydrogen-containing compound (polyol) in the presence of a bis[beta(N,N-dimethylamino)alkyl]ether catalyst is disclosed in U.S. Pat. No. 3,330,782.

Several processes for the production of bis[beta(N,N-dimethylamino)ethyl]ethers, including BDMEE, are known. One process which utilizes di(2-chloroethyl) ether as a reactant is disclosed in U.S. Pat. Nos. 3,400,157 and 3,426,072. However, there are several disadvantages associated with the use of di(2-chloroethyl) ether, including (a) the need to employ comparatively expensive corrosion resistant equipment because of the presence of chlorides in the reaction mixture, (b) disposal problems associated with by-product chlorides, and (c) the relatively high cost and lack of readily available di(2-chloroethyl) ether. Another process for the production of bis[beta(N,N-dimethylamino)alkyl]ethers involves reacting a beta(N,N-dimethylamino) alkanol, a beta(N,N-di-methylamino) alkyl chloride, and an alkali metal hydroxide using a modified Williamson synthesis as disclosed in U.S. Pat. No. 3,480,675. However, this modified Williamson synthesis has several disadvantages including (a) several solids handling steps, (b) a discontinuous mode of operation, (c) disposal problems associated with by-product sodium chloride, and (d) one of the reactants, 2-dimethyl-aminoethyl chloride, used in the production of BDMEE is an unstable liquid and is also a vesicant which requires special handling. A further process for the production of BDMEE which comprises reacting trimethylamine with 2-[2-(N,N-dimethylamino)ethoxy]ethanol in the presence of a nickel catalyst under superatmospheric pressure is disclosed in U.S. Pat. No. 3,957,875. However, this process requires the use of a costly high-pressure reactor and provides product yields that leave room for improvement. Accordingly, it is desirable to provide a process for the production of bis(N,N-dialkylamino)alkyl ethers including BDMEE, that does not possess the disadvantages associated with the above-mentioned processes.

Two recent patents have sought to provide a more satisfactory process for preparing bis-(N,N-dialkylamino)alkyl ethers without the aforesaid disadvantages. In U.S. Pat. No. 4,177,212 a two-step, one pot, reaction is described that reacts a sodio N,N-dialkylaminoalkoxide with a sulfur oxychloro-containing compound in the presence of an organic diluent and an N,N-dialkylaminoalkanol to produce an intermediate and thereafter heating the intermediate to elevated temperatures to produce the bis-(N,N-dialkylamino)alkyl ether. U.S. Pat. No. 4,247,482 is also a two-step, one pot, process that utilizes $SO_3$ vapor and sodio N,N-dialkylaminoalkoxide to provide an intermediate which is likewise heated at elevated temperatures to obtain the bis(N,N-dialkylamino)alkyl ether. Although these patents avoid many of the problems associated with the prior art, there continues to exist a need for processes that are simpler to operate and more economic to run.

The present invention is believed to provide these advantages through the direct reaction of alkanolamines over acid catalysts. Practical syntheses of bis-aminoalkyl ethers directly from alkanolamines are conspicuously absent from the literature.

The amine function complicates the direct acid-catalyzed synthesis since it provides an alternate reaction pathway which does not lead to ethers. For example, over a solid acid, amines may bind strongly at the acid sites and thus inhibit formation of alkoxide which reacts further to the ether. In fact, blockage of Lewis sites on alumina with pyridine nearly eliminates formation of diethylether from ethanol. The relative basicity of nitrogen and oxygen then governs the relative rates for each pathway. Unfortunately, because nitrogen is more basic than oxygen, reaction will occur preferentially at the amine. Thus, the direct etherification is not favored. Any hope of success then rests on some reversibility of the amine adsorption at the acid site, some equilibrium which would allow for hydroxyl attack, or an entirely different mechanism.

Thus, the present invention is indeed a novel and unexpected advance in the art.

SUMMARY OF THE INVENTION

The instant invention provides a novel process for producing bis-(N,N-dialkylamino)alkyl ether. The novel process comprises reaction of one or more (N,N-dialkylamino)alkanols of the general formula

$R_2NR'OH$ wherein R is individually an alkyl group containing from one to four carbon atoms and R' is a bivalent alkylene group having from 2 to 4 carbon atoms inclusive, over a heterogeneous solid acid catalyst, to provide bis-(N,N-dialkylamino)alkyl ethers of the formula:

$(R_2NR')_2O$ wherein R and R' are as set forth above.

DETAILED DESCRIPTION OF THE INVENTION

In accordance with the instant invention there is provided a novel process for producing bis-(N,N-dialkylamino)alkyl ethers. In general terms the process comprises a direct reaction of (N,N-dialkylamino)alkanol over a heterogeneous solid acid catalyst.

The (N,N-dialkylamino)alkanols useful for the purposes of the present invention are alkanols or mixtures thereof selected from the group of the general formula:

$R_2NR'OH$ wherein R is individually an alkyl group containing from one to four carbon atoms and R' is a bivalent alkylene group having from 2 to 4 carbon atoms inclusive. The groups R and R' may be branched so long as the branching is not on a carbon atom adjacent to either the nitrogen atom or the oxygen atom. Preferably, the (N,N-dialkylamino) alkanol is (N,N-dimethylamino)ethanol.

The (N,N-dialkylamino)alkanols referred to above are well known in the art and commercially available. They can be prepared by a variety of well known techniques.

The (N,N-dialkylamino)alkanol is passed, in vapor phase, over a heterogeneous solid acid catalyst. Because significant secondary reactions can occur it is preferred that as the product forms it is rapidly removed from continued contact with the catalyst. Although this may be accomplished in any of a variety of ways, it has been found particularly useful to employ an inert carrier (diluent). Any inert gas such as, for example, helium, argon, methane, hydrogen, nitrogen, paraffin hydrocarbons and the like may be employed. It should be noted however that the process may be operated in the absence of a carrier and still yield the desired product.

The useful catalysts for the instant process are generally considered heterogeneous solid acids. The broad range of heterogeneous solid acids evaluated justifies such a generic description. Indeed non-limiting examples of such acids would include gamma-alumina, silica-alumina, silica-titania, silica-zirconia, boron phosphate, acidic clays, various mixed oxides with alumina and zeolites. Solid bases or those solid acids whose acid sites are fully neutralized have not been found to effect the conversion. Thus, the activity of a partially neutralized catalyst can be correlated with the acid site concentration.

Useful heterogenous solid acid catalysts include, but are not necessarily limited to, gamma alumina (gamma-$Al_2O_3$); modified gamma alumina (with 1-4% HF, 7% $TiO_2$, 15% $B_2O_3$, etc); silica aluminas; silica-titania; boron phosphate; zeolites; and the like.

The process chemistry over these acid catalysts is complex due in part to the number of potentially reactive sites in both reactant and products. Of course, any dependence on the type of acid site, either Lewis or Bronsted, further complicates the process. The problem, however, is double-edge: the very acid sites, which are required to effect the etherification, probably catalyze secondary reactions and provide alternate pathways to byproducts in competition with synthesis of the bis(N,N-dialkylamino)alkyl ethers. The complex interplay of catalyst formation, acid strength, acid type, and process variables complicates any attempt to determine a mechanism for product formation. It is believed however that the most plausible explanation for formation of the bis(N,N-dialkylamino)alkyl ether is direct, acid-catalyzed etherification of the alcohol. This simple and intriguing route is as follows:

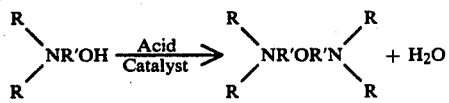

The preparation of the catalysts is well known. One can precipitate a hydrous oxide from a solution of a soluble precursor, e.g. $Al(NO_3)_3 \cdot 9H_2O$, in water upon addition of a base. The precipitated mass is washed, dried and calcined at the appropriate conditions to yield the acid catalyst, for example, gamma-$Al_2O_3$. Alternatively a powdered acid catalyst can be dispersed through a support having pores of sufficient diameter to allow incorporation of the catalyst particles onto the support. An alternative technique for preparing a catalyst on a support is to apply a solution of the catalyst precursor onto a sufficiently nonreactive support, followed by drying and firing at temperatures and for times sufficient for formation of the acidic catalyst.

The catalyst can be used in the form of a well-pulverized powder, for example, in fluid bed or slurry reactors when liquid phase reactions are desired. Alternatively, the powder can be formed into porous catalyst pellets using conventional pellet presses, rolling mixers or extruders. Dispersants, binders and lubricants are often beneficial in the preparation of such pellets.

The form of the catalyst is not important provided it does not in any way inhibit the efficient operation of the process. For example, catalyst powders or small catalyst particles could induce high back pressure in the vapor phase or in the liquid phase trickle bed reactor and non uniform reactant flow through the catalyst bed.

Deactivated catalyst can be restored to full activity with an oxygen treatment at 500° C. for several hours. Milder conditions, perhaps using air, should be adequate. Apparently, amine residues which turn the catalyst brown are oxidized and removed. The original, white color of the catalyst is restored.

The process is preferably carried out such that the feedstock is contacted in a reaction zone containing the acid catalyst under effective reaction conditions. A fixed bed, fluidized bed, or moving bed reactor configuration may be employed. Alternatively, the process could be carried out in the trickle bed mode. Also, the catalyst as a well pulverized powder may be slurried in the liquid alkanolamine or a liquid solution of the alkanolamine under reaction conditions provided the products of the reaction are removed in a continuous manner. In all cases, the residence time of the products in the reactor zone must be sufficiently short to prevent secondary reactions.

The reaction is expected to be operable within a temperature range of from about 100° to 450° C. For optimum efficiency and yield the reaction temperature should fall within about 200° to 400° C. and preferably about 250° to 350° C. In general, lower temperatures result in lower rates of conversion whereas higher temperatures, while increasing conversion rates, result in lower yields of the desired product and higher yields of by-products. The temperature should not reach the decomposition temperature of the catalyst when, for example, resin catalysts are employed.

Although atmospheric pressure is preferred, subatmospheric and superatmospheric pressures can be employed, such operable pressures are, for example, those pressures between 0.001 to 100 atmospheres.

The limits for the residence time for reaction are not narrowly critical and can vary over a broad range but should be controlled so as to minimize by-product formation. The time will vary depending upon, among other factors, the reactor size, the specific acid catalyst and the form in which the catalyst is employed. Accordingly, residence time must be determined on an individual basis so as to take into account all of the system variables.

Recovery of the bis-(N,N-dialkylamino)alkyl ether product can be effected by any known method. Preferably, the method involves a stripping distillation at the end of the reaction sequence. The efficiency of the process will, however, likely depend upon the particular catalyst chosen and the time on stream.

As indicated above, the process of the present invention is useful in preparing bis-(N,N-dialkylamino)alkyl ethers characterized by the formula $(R_2NR')_2O$ wherein R and R' are defined above. Bis-(N,N-dialkylamino)alkyl ethers encompassed by the formula include:
bis[beta(N,N-dialkylamino)ethyl]ether;
bis[beta(N,N-dialkylamino)-1-methylethyl]ether;
bis[3-(N,N-dimethylamino)propyl]ether;
bis[beta-(N,N-diethylamino)ethyl]ether;
bis[beta(N,N-diethylamino)-1-methylethyl]ether; and
bis[beta(N,N-diethylamino)propyl]ether.

The preferred bis(N,N-dialkylamino)alkyl ether is bis(N,N-dimethylamino)ethyl ether. These ethers are useful as catalysts in the production of polyurethane, especially cellular polyurethanes.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

DEFINITIONS

The following abbreviations used in the examples are as defined below:
BDMEE = bis-(N,N-dimethylamino)ethyl ether

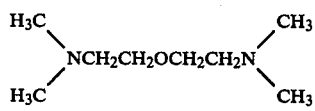

DMEA = N,N-dimethylethanolamine, or (N,N-dimethylamino)ethanol

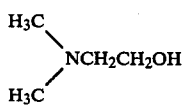

NMM = N-methylmorpholine

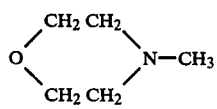

DMP = Dimethyl piperazine

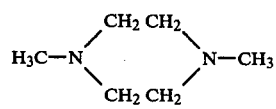

DMEA—ME = Methyl ether of DMEA

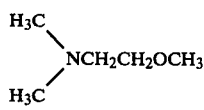

TMED = Tetramethylethylenediamine

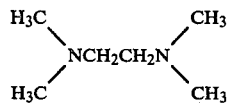

TMA = Trimethylamine

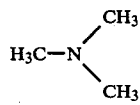

DMA = Dimethylamine

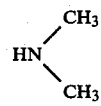

All experiments were carried out in a fixed bed, continuous flow reactor. The catalyst was contained in a 20 mm diameter quartz or Pyrex tube 38 centimeters long mounted vertically in a split tube furnace. The temperature of the bed was controlled to ±1° C. by proportional temperature controllers. Three indentations at the middle of the tube supported the catalyst charge which was packed between plugs of quartz wool. Typically, a 5 g sample (5–10 cc by volume) was charged. The remainder of the tube above the catalyst was filled with ⅛ inch diameter glass helices for a vaporization bed. Liquid DMEA was delivered with a syringe pump equipped with 50 or 100 ml syringes at a rate of 0.75 or ~3.6 g/hr directly onto the glass helices. Nitrogen carrier gas at atmospheric pressure purged the reactor at about 80 cc/min. The product stream was quenched in a tube or flask cooled in a dry ice/acetone bath.

The condensed samples were analyzed by gas chromatography with a thermal conductivity detector. A 10% CARBOWAX 20M-TPA/Chromosorb T (40/60 mesh, 10'×⅛ inch stainless steel, 50cc/min helium flow) was employed. The three components separated well in a programmed temperature mode from 80° C. to 290° C. at 6°/min. Two ul samples were injected on each column. Peak areas and calculated weight percentage composition were obtained.

All products were identified initially by the gc-ms technique. Authentic samples were injected to confirm the retention times.

MATERIALS

Anhydrous DMEA (~99.5 area % purity) and tetraethylorthosilicate were obtained from Union Carbide Corporation. An authentic sample of the methyl ether of DMEA was prepared according to R. N. Icke, B. B. Wisengarver, G. A. Alles, "Organic Synthesis Collective, Vol. III", p. 723. All other chemicals were reagent grade.

CATALYST PREPARATION

Except as described below, all catalysts were commercial samples and were used as received.

Gamma-alumina with Na$_2$O, TiO$_2$, B$_2$O$_3$ and HF additives were prepared by impregnating the gamma-alumina with one pore volume of an aqueous solution of the additive salt whose concentration is such as will give the desired composition in the finished catalyst.

NaNO3, NaOH, Ti-lactate (Tyzor) TM solution, HBO3 and 49% HF solution were used as additive salts. The impregnated catalyst was dried overnight at 100° C. and then calcined in air at 500° C. for four (4) hours. Two silica aluminas were similarly prepared for a commercial grade silica gel (Davison TM Grade 59) and an aqueous solution of AlCl3.

A 50% $SiO_2$/50% $TiO_2$ catalyst was prepared as described in K. Tanake, M. Ito, and M. Sato, *J. Chem. Soc., Chem. Comm.*, (1973), pg 676.

A 50% $SiO_2$/50% $ZrO_2$ catalyst was prepared as described in V. A. Dzisko, "Proc. Intern. Congr. Catalysis, 3rd, Amsterdmam, I" No. 19 (1964).

An $AlF_3 + AlOF_x$/gamma-$Al_2O_3$ catalyst was prepared as described in T. V. Antipina, O. G. Bulgakov and A. V. Urarov "4th International Congress on Catalysis, Moscow", No. 77 (1968).

A $BPO_4$ catalyst was prepared as described in J. B. Moffat and A. S. Riggs, *J. Catalysis*, 28, p157 (1973).

H+-Ω zeolite was prepared by carefully calcining the ammonium exchanged form from a commercial producer in a shallow dish. With a dry air flow of 300 ml/min the sample was slowly heated to 220° C. over a one hour period and then held at that temperature for one hour. The temperature was raised to 550° C. over one hour and then held there for one hour. The sample was cooled under dry air and stored in an anhydrous environment.

TABLE I

| Activity[a] of gamma-alumina | | | | |
|---|---|---|---|---|
| | Temperature, °C. | | | |
| | 250 | 275 | 300 | 325 |
| DMEA Conversion, %[b] | 15,4 | 54,26 | 66,30 | 90,84 |
| Molar Efficiency, %[b] | | | | |
| BDMEE | 10,23 | 29,31 | 24,30 | 8,14 |
| NMM | 3,28 | 17,16 | 18,13 | 15,12 |
| DMP | nd | 13,14 | 15,14 | 18,16 |
| DMEA-ME | nd | 11,12 | 11,11 | 7,7 |
| TMED | nd | 1,1 | 7,7 | 13,12 |
| DMEA Feed Rate, g/hr. | 0.8 | 3.4 | 3.3 | 3.2 |
| Run Time, hr. | 22 | 28 | 30 | 5 |

Footnotes:
[a] 5 g of commercial grade gamma-$Al_2O_3$ (SA=220 $m^2$/g) was charged for each run. Nitrogen flow rate was 80 cc/min. Data was collected every two or three hours during the run. The initial value was taken two hours after the start of DMEA feeding.
[b] For entries consisting of two data points, the first is the initial 2 hr. value and the second is the value after the indicated hours of operation.
(nd) The compound was not determined.

TABLE II

| | Activity[a] of Several Aluminas | | | |
|---|---|---|---|---|
| | gamma-$Al_2O_3$ Harshaw TM Al-1404 | gamma-$Al_2O_3$ Linde UCAL TM -200 | gamma-$Al_2O_3$ Linde TM 60-501 | gamma-$Al_2O_3$ Girdler TM T-126 |
| Temperature, °C.[b] | 275 300 | 275,300 | 275 300 | 275 |
| DMEA Conversion, %[c] | 45,29 62,54 | 30,16 39 | 53,26 65,34 | 61,19 |
| Molar Efficiency, %[c] | | | | |
| BDMEE | 31,30 27,29 | 36,35 33 | 26,30 22,30 | 11,18 |
| NMM | 22,23 17,16 | 15,14 14 | 22,16 14,12 | 17,12 |
| DMP | 11,15 14,14 | 11,10 12 | 18,15 14,14 | 25,19 |
| DMEA-ME | 17,15 11,11 | 13,15 10 | 13,12 8, 9 | 5, 6 |
| TMED | 0, 2 6, 6 | 2, 2 5 | 4, 4 8, 6 | 15,13 |
| DMEA Feed Rate, g/hr. | 3.6 3.6 | 3.5 3.5 | 3.4 3.4 | 3.4 |
| Total Run Time, hr. | 25.6 6 | 24 6 | 23 21 | 31,5 |

Footnotes:
[a] About 5 g of material was charged for each run. Nitrogen flow rate was 80 cc/min. Data was collected every two or three hours during the run. The initial value was taken two hours after the start of DMEA feeding.
[b] Data for the second temperature was obtained without interruption of the run by raising the temperature after the indicated hours of operation of the lower value.
[c] For entries consisting of two data points, the first is the initial 2 hr. value and the second is the value after the indicated hours of operation.

TABLE III

| | Activity[a] of gamma-$Al_2O_3$ With Additives | | | | | | | |
|---|---|---|---|---|---|---|---|---|
| Additive | 0.5% $Na_2O$ | 1% HF | 2% HF | 4% HF | $AlF_3$ & $AlOF_x$ | 5% $B_2O_3$ | 15% $B_2O_3$ | 4% $TiO_2$ |
| Temperature[b] | 275 | 275 | 275 | 275 300 | 275 | 275 | 275 | 250 275 |
| DMEA Conversion, %[c] | 19,11 | 40,16 | 70,26 10 | 47,18 53,47 | 90,57 23 | 88,54 30 | 94,48 | 25,9 34 |
| Molar Efficiency, %[c] | | | | | | | | |
| BDMEE | 28,28 | 26,31 | 16,28 36 | 21,34 23,25 | 1,23 11 | 7,21 26 | 1,15 | 19 19 |
| NMM | 20,23 | 16,12 | 22,10 10 | 31,15 20,18 | 33,25 24 | 26,16 13 | 21,14 | 12 12 |
| DMP | 8, 7 | 18,17 | 25,11 13 | 19,15 17,17 | 22,21 21 | 30,24 21 | 35,23 | nd nd |
| DMEA-ME | 16,18 | 9,10 | 5, 5 0 | 2, 2 1, 1 | 1, 1 1 | 3, 1 6 | 0, 3 | nd nd |
| TMED | 0, 0 | 6, 5 | 10,10 10 | 17,13 23,23 | 14,17 14 | 12, 6 10 | 13,17 | nd nd |
| DMEA Feed Rate, g/hr. | 3.6 | 3.4 | 0.8 3.8 | 3.4 3.4 | 0.8 3.4 | 0.8 3.7 | 0.8 | 0.8 0.8 |
| Total Run Time, hr. | 8 | 28.5 | 24.5 7 | 24 6 | 25.5 9 | 24.5 7 | 29 | 23 6 |

Footnotes:
[a]-[c] See corresponding footnotes in TABLE II
(nd) This compound was not determined by the analytical method used at the time of this experiment.

TABLE IV

| | Activity[a] of Several Silica Aluminas | | | |
|---|---|---|---|---|
| Catalyst | 5% $Al_2O_3$/ $SiO_2$ | 15% $Al_2O_3$/ $SiO_2$ | 15% $Al_2O_3$ 85% $SiO_2$ (AKZO TM LA-30) | 13% $Al_2O_3$ 87% $SiO_2$ (Davison TM 980-13) |
| Temperature, °C.[b] | 275 300 | 250 275 | 275 | 275 300 |
| DMEA Conversion, %[c] | 36,14 35 | 40,17 33,14 | 67,10 | 53,11 39,30 |

TABLE IV-continued

Activity[a] of Several Silica Aluminas

| Catalyst | 5% Al$_2$O$_3$/ SiO$_2$ | 15% Al$_2$O$_3$/ SiO$_2$ | 15% Al$_2$O$_3$ 85% SiO$_2$ (AKZO ™ LA-30) | 13% Al$_2$O$_3$ 87% SiO$_2$ (Davison ™ 980-13) |
|---|---|---|---|---|
| Molar Efficiency, %[c] | | | | |
| BDMEE | 31,36 35 | 12,20 20,32 | 8,34 | 5,19 15,16 |
| NMM | 15,12 10 | 10,15 7,11 | 20,12 | 38,18 14,12 |
| DMP | 19,18 17 | 14,15 10,15 | 10,10 | 24,24 21,22 |
| DMEA-ME | 10,10 7 | nd nd nd | nd | 4, 6 3,3 |
| TMED | 5, 4 · 4 | nd nd nd | nd | 8, 5 10,10 |
| DMEA Feed Rate, g/hr. | 3.4 3.3 | 0.8 0.8 | 0.75 | 3.5 3.4 |
| Total Run Time, hr. | 23 7 | 25 25 | 30 | 21 6 |

Footnotes:
[a]-[c] and nd See corresponding footnotes in TABLE III

TABLE V

Activity[a] of Miscellaneous Catalysts

| Catalyst | 50% SiO$_2$ 50% TiO$_2$ Calcined 500° C. | 50% SiO$_2$ 50% TiO$_2$ Calcined 900° C. | 50% SiO$_2$ 50% ZrO$_2$ | BPO$_4$ (Bulk) | 10% WO$_3$/ Al$_2$O$_3$ (Harshaw ™ W-0801) | Montmorillonite |
|---|---|---|---|---|---|---|
| Temperature, °C.[b] | 275 | 275 | 275 300 | 275 | 275 | 275 300 |
| DMEA Conversion, %[c] | 91,33 | 39,9 | 25,3 6, 5 | 37,25 | 91,37 | 29,6 11 |
| Molar Efficiency, %[c] | | | | | | |
| BDMEE | 2,16 | 10,29 | 3,7 7,10 | 0.5, 4 | 1,19 | 2,15 14 |
| NMM | 20,10 | 23,24 | 13,2 5, 7 | 0, 0 | 17,13 | 46,20 11 |
| DMP | 34,23 | 18, 0 | 30,12 14,17 | 57,51 | 23,20 | 25,20 18 |
| DMEA-ME | nd | nd | 1,0 0, 0 | 2, 3 | 1,10 | 2, 4 3 |
| TMED | nd | nd | 19,0 14,15 | 3,0 | nd,13 | 10, 7 14 |
| DMEA Feed Rate, g/hr | 0.75 | 0.75 | 3.5 3.5 | 3.5 | 0.75 | 3.5 3.5 |
| Total Run Time, hr. | 28 | 29 | 25.5 5 | 28.5 | 28 | 22.5 6 |

Footnotes:
[a]-[e]See corresponding footnotes in TABLE III

TABLE VI

Activity[a] of Zeolites

| Catalyst | H+ − Ω | | H+ − Ω | | H+ −Mordenite | | H+, Na+−L 83% H+Exchanged | | H+,Na+−L 68% H+−Exchanged | | |
|---|---|---|---|---|---|---|---|---|---|---|---|
| Temperature, °C.[b] | 250 | 275 | 300 | 325 | 275 | 300 | 275 | 300 | 275 | 300 | 325 |
| DMEA Conversion, %[c] | 59,6 | 24,16 | 100,50 | 24,18 | 13,8 | 22,22 | 29,9 | 25 | 24,10 | 39,18 | 44,35 |
| Molar Efficiency %[c] | | | | | | | | | | | |
| BDMEE | 3,28 | 30,36 | 0.5,23 | 26,29 | 34,35 | 35 | 28,32 | 30 | 25,31 | 30,34 | 28,30 |
| NMM | 17,27 | 17,14 | 9, 8 | 8, 9 | 16,13 | 14 | 16,10 | 9 | 15,11 | 15,15 | 10, 9 |
| DMP | 10,15 | 17,16 | 9,13 | 11,12 | 13,10 | 14 | 16,16 | 14 | 16,14 | 16,16 | 14,14 |
| DMEA-ME | nd | nd | 1, 3. | 5, 5 | 12,13 | 10 | 7, 8 | 6 | 7, 9 | 7, 8 | 6, 6 |
| TMED | nd | nd | 9, 9 | 8, 7 | 0, 0 | 0 | 11, 8 | 13 | 10, 8 | 12,9 | 14,13 |
| DMEA Feed Rate, g/hr | 0.75 | 0.75 | 0.75 | 3.5 | 3.5 | 3.5 | 3.5 | 3.5 | 3.5 | 3.5 | 3.5 |
| Total Run Time, hr. | 21 | 9 | 22.5 | 9 | 24¼ | 6 | 23 | 21¼ | 8¾ | 22¾ | 6 |

[a]-[c] and nd See corresponding footnotes in TABLE III

TABLE VII

ACTIVITY[a] OF OTHER ZEOLITES

| Catalyst | LZ-Y82 ™ Linde | SK500 ™ Linde | |
|---|---|---|---|
| Temperature, °C.[b] | 275 | 250 | 275 |
| DMEA Conversion, %[c] | 60,11 | 100[f], 7 | 5 |
| Molar Efficiency, %[c] | | | |
| BDMEE | 7,28 | 0,6 | 25 |
| NMM | 17,10 | 0,8 | 10 |
| DMP | 17,15 | 0,15 | 5 |
| DMEA-ME | 4,9 | nd | nd |
| TMED | 22,11 | nd | nd |
| DMEA Feed Rate, g/hr. | 3.4 | 0.75 | 3.4 |
| Total Run Time, hr. | 31.5 | 23 | 8¾ |

Footnotes:
[a]-[e]See corresponding footnotes in TABLE III.
[f]The initial 2-hr. sample at 250° C. contained only water and TMA.

I claim:

1. A process for producing bis-(N,N-dialkylamino)alkyl ether having the general formula:

(R$_2$NR')$_2$O wherein R is individually an alkyl group containing from one to four carbon atoms and R' is a bivalent alkylene group having from 2 to 4 carbon atoms inclusive, said process comprising reacting one or more (N,N-dialkylamino) alkanols of the general formula:

R$_2$NR'OH wherein R and R' are as defined above, over a heterogeneous solid acid catalyst under effective reaction conditions and optionally in the presence of an inert carrier gas for a period of time sufficient to produce the bis-(N,N-dialkylamino)alkyl ether and thereafter recovering said bis-(N,N-dialkylamino)alkyl ether.

2. The process of claim 1 wherein the (N,N-dialkylamino)alkanol is (N,N-dimethylamino)ethanol and the bis-(N,N-dialkylamino)alkyl ether is bis-(N,N-dimethylamino) ethyl ether.

3. The process of claim 1 wherein the reaction conditions are a temperature range of from about 100° to 450°

C. and a pressure range of from about 0.001 to 100 atmospheres.

4. The process of claim 3 wherein the pressure is atmospheric and the temperature is within the range of about 200° to 400° C.

5. The process of claim 4 wherein the temperature is from about 250° to 350° C.

6. The process of claim 1 wherein the inert carrier gas is selected from the group consisting essentially of helium, argon, methane, hydrogen, nitrogen and paraffin hydrocarbons.

7. The process of claim 1 wherein the heterogeneous solid acid catalyst is selected from the group consisting of gamma-alumina, modified gamma-alumina, silica-alumina, silica-titania, boron phosphate and zeolites.

8. A process of producing bis-(N,N-dimethylamino) ethyl ether by reacting (N,N-dimethylamino) ethanol in a vapor phase over a heterogeneous solid acid catalyst at a temperature from about 200° to 400° C. at atmospheric pressure in the presence of an inert gas carrier and thereafter recovering said bis-(N,N-dimethylamino) ethyl ether.

9. The process of claim 8 wherein the temperature is from about 250° to 350° C.

10. The process of claim 8 wherein the heterogeneous solid acid catalyst is selected from the group consisting essentially of gamma-alumina, modified gamma-alumina, silica-alumina, silica-titania, boron phosphate, and zeolites.

11. The process of claim 8 wherein the inert gas carrier is selected from the group consisting essentially of helium, argon, methane, hydrogen, nitrogen and paraffin hydrocarbons.

12. The process of claim 8 wherein the reaction takes place in a fixed bed reactor.

13. The process of claim 8 wherein the reaction takes place in a fluidized bed reactor.

14. The process of claim 8 wherein the reaction takes place in a moving bed reactor.

15. The process of claim 8 wherein the reaction takes place in a trickle bed reactor as a liquid phase.

* * * * *